(12) United States Patent
Faure et al.

(10) Patent No.: US 11,816,011 B2
(45) Date of Patent: Nov. 14, 2023

(54) COMPUTERIZED METHOD AND SYSTEM FOR VALIDATING A COMPUTING INFRASTRUCTURE BY MINING

(71) Applicant: BULL SAS, Les Clayes-sous-Bois (FR)

(72) Inventors: Guillaume Faure, Grenoble (FR); Alain Massiot, Muret (FR)

(73) Assignee: BULL SAS, Les Clayes-sous-Bois (FR)

( * ) Notice: Subject to any disclaimer, the term of this patent is extended or adjusted under 35 U.S.C. 154(b) by 301 days.

(21) Appl. No.: 17/129,225

(22) Filed: Dec. 21, 2020

(65) Prior Publication Data

US 2021/0191834 A1 Jun. 24, 2021

(30) Foreign Application Priority Data

Dec. 23, 2019 (FR) ...................................... 1915427

(51) Int. Cl.
*G06F 11/34* (2006.01)
*G06F 16/27* (2019.01)
(Continued)

(52) U.S. Cl.
CPC .......... *G06F 11/3428* (2013.01); *G06F 1/206* (2013.01); *G06F 11/3006* (2013.01); *G06F 16/27* (2019.01); *G06F 2216/03* (2013.01)

(58) Field of Classification Search
CPC ............. G06F 11/3006; G06F 11/3089; G06F 11/3428; G06F 1/206; G06F 16/27; G06F 2216/03
(Continued)

(56) References Cited

U.S. PATENT DOCUMENTS 7,047,291 B2 * 5/2006 Breese .................... H04L 43/12
709/224
2016/0356800 A1 * 12/2016 Glavina .................. G16Z 99/00
(Continued)

FOREIGN PATENT DOCUMENTS

CN 108458472 A 8/2018
WO 2019/116375 A1 6/2019

OTHER PUBLICATIONS

Jingming Li, et al., "Energy consumption of cryptocurrency mining: A study of electricity consumption in mining cryptocurrencies", Nov. 23, 2018, College of Civil Engineering, Hunan University, Changsha 410081, China.
(Continued)

*Primary Examiner* — John H Le
(74) *Attorney, Agent, or Firm* — ARC IP LAW, PC; Joseph J. Mayo

(57) ABSTRACT

A quality control method of a hardware and software computing infrastructure by a quality control computing system. The quality control method including connecting the hardware and software computing infrastructure to a blockchain database by a management and automation software, mining by the computing resources of a blockchain from the blockchain database using the management and automation software, and monitoring performances of the mining operations and recording values of performances in a database of the quality control computing system. The quality control computing system for the hardware and software computing infrastructure is also disclosed to implement the quality control method.

13 Claims, 1 Drawing Sheet

(51) Int. Cl.
*G06F 1/20* (2006.01)
*G06F 11/30* (2006.01)

(58) Field of Classification Search
USPC ......................................................... 702/186
See application file for complete search history.

(56) References Cited

U.S. PATENT DOCUMENTS

2019/0121889 A1* 4/2019 Gold .......................... G06F 3/06
2019/0392406 A1* 12/2019 Deshpande ........ G06Q 20/3674
2020/0142988 A1* 5/2020 Chao ..................... G06F 9/4881

OTHER PUBLICATIONS

Search Report and Written Opinion issued in FR1915427 dated Aug. 13, 2020.
European Search Report issued in EP20217150 dated Feb. 4, 2021.
Li, et al., "Energy Consumption of cryptocurrency mining: A study of electricity consumption in mining cryptocurrencies": Energy vol. 168, pp. 160-168 (2018).
Li, et al., "Energy Consumption of cryptocurrency mining: A study of electricity consumption in mining cryptocurrencies"; Elsevier: Energy 168 (2018).

* cited by examiner

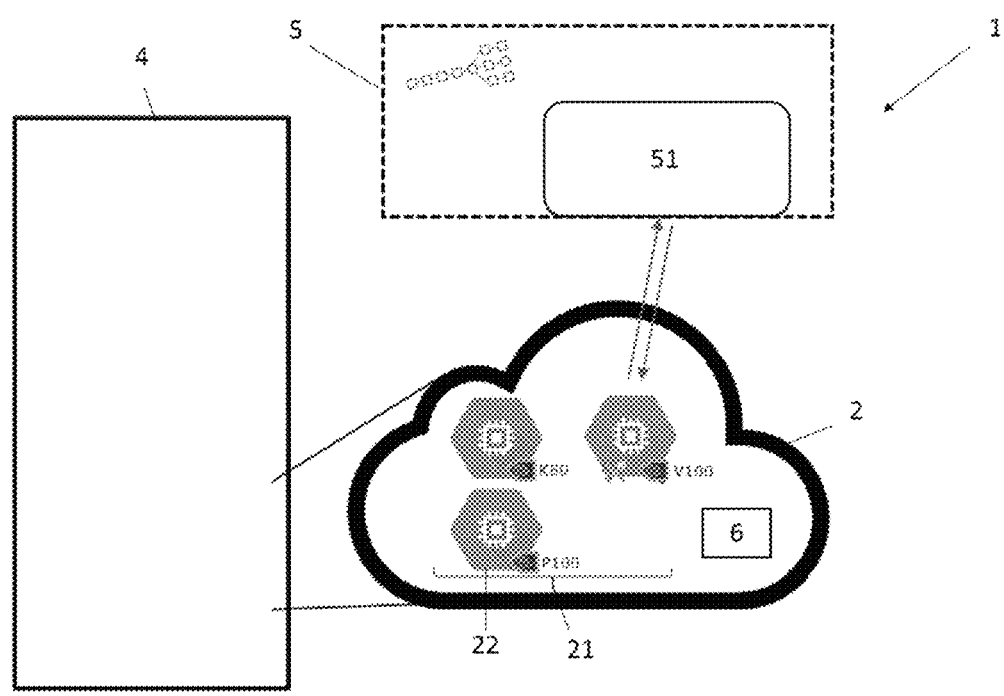

COMPUTERIZED METHOD AND SYSTEM FOR VALIDATING A COMPUTING INFRASTRUCTURE BY MINING

TECHNICAL FIELD OF THE INVENTION

The present invention generally relates to the field of methods of validating computing systems, particularly validating supercomputers.

PRIOR ART

It is known that since quality control and validation methods are currently lengthy and rather expensive, it could therefore be beneficial to take advantage of the computing resources used during these methods, resources which until now have been used only to measure the raw performances of a supercomputer.

Indeed, the power consumption of a supercomputer during a quality control operation can, for example, be 500 kWh, to which approximately the same power consumption must be added by the cooling system, since 95% of the energy used by a supercomputer is released as heat. In this context, reorienting the energy used to produce a wealth can be particularly advantageous, in view of the cost of such a quality control operation, performed on each assembled supercomputer.

WO2019/116375 teaches a system wherein the excess electricity, solar energy in this instance, is used in a system for mining purposes, an activity known to be very energy intensive.

Other reuses have been disclosed. For example, patent CN108458472 describes a water heating device, taking advantage of the hot water recovered in a water-cooling system of GPU and CPU blocks of a blockchain mining facility, these servers producing a great deal of heat during their use. Thus, the production of heat is reoriented for useful purposes and there is less energy loss, in this instance less loss of heat.

DISCLOSURE OF THE INVENTION

Validation methods of a supercomputer require considerable resources and need to be repeatable and traceable. These resources are currently used with no other purpose than the validation itself because it is expected that a supercomputer will be taken out of a production chain and validated before making it perform technical operations such as computing operations for meteorology, artificial intelligence or any other field that requires substantial resources, particularly at the level of graphic cards. Therefore, the computations must be certain. Moreover, this validation should preferably be performed automatically. Therefore, it would be beneficial to take advantage of the computation resources used during a useful task, such as mining, to validate the quality of an assembly, for example a supercomputer. Mining should not take longer than validation, in order to establish a cost optimization program through the use of mining, while adhering to the constraints of time and repeatability.

The purpose of the present invention is therefore to propose a method and a computing system for validating a computing infrastructure by mining, allowing at least some of the disadvantages of the prior art to be overcome.

This purpose is achieved by a quality control computing system for a computing infrastructure, the system comprising:

At least a hardware and software computing infrastructure (2), preferably supercomputing, centralized or decentralized, comprising computing resources (21), preferably intensive computing resources, the computing infrastructure being capable of being connected to a decentralized blockchain database and of performing mining operations on said blockchain (5).

computing operations management and automation software (4), configured to automate the connection of the computing infrastructure to the blockchain, and the mining performed by the computing resources (21), for example computing, of at least one, preferably a plurality, of hardware and software computing infrastructures, quality control software associated with probes present in the computing infrastructure, the quality control software being configured to monitor the performances of the infrastructure and mining operations with the aid of said probes, in order to record said performances in a database (6) of the infrastructure or the system and in order to compare the recorded performance values to the control performance values, and preferably to indicate, following the comparison, the status of the computing infrastructure's quality control.

According to one feature, the quality control software is configured to provide said control performance values by carrying out a conventional quality control test, for example by performing the Linpack's Highly Parallel Computing Benchmark (HPLinpack), the software being capable of computing and recording control values, for example a bracket of control values from values measured during said conventional test.

According to another feature, the computing resources comprise at least a GPU graphic processor or at least a specialized ASIC processor, the mining being performed by said at least one GPU graphic processor of the infrastructure or said at least one specialized ASIC processor.

According to another feature, the management and automation software (4) is capable of having the mining performed by only one specific processor, a portion of the processors, or all of the processors that comprise the computing resources of the computing infrastructure.

According to another feature, the management and automation software (4) is capable of having the mining performed by computing resources (21) of a plurality of hardware and software computing infrastructures.

According to another feature, the database of the system on which the mining performances are recorded forms part of the storage means of the hardware and software computing infrastructure.

According to another feature, the management and automation software makes it possible to use a plurality of different mining algorithms to mine a plurality of different blockchains at the same time.

According to another feature, the quality control software is executed by said hardware and software computing infrastructure in order to perform its own quality control. The results are then compared with the equivalent hardware from a conventional test infrastructure. A comparative matrix will be created for each new generation of hardware.

According to another feature, the hardware and software computing infrastructure is oriented for intensive computation and for artificial intelligence.

According to another feature, the hardware and software computing infrastructure comprises a modular system of air-cooled blades, designed especially for intensive or high-performance computing and comprising a plurality of processors.

The invention also relates to a quality control method of a hardware and software computing infrastructure by a system according to any one of the preceding claims, characterized in that it comprises the following steps:
- Connecting the hardware and software computing infrastructure to the blockchain database by the computing operations management and automation software,
- Mining by the computing resources of the computing infrastructure of a blockchain of at least one blockchain database by means of the computing operations management and automation software,
- Monitoring performances of the mining operations and recording values of said performances in a database of the system.

According to another feature, the method further comprises a step of comparing said recorded performance values to control performance values.

According to another feature, the method further comprises a step of indicating, following the comparison, the status of the computing infrastructure's quality control.

According to another feature, the mining by the computing resources is performed on at least two different blockchains.

BRIEF DESCRIPTION OF THE FIGURES

Other features, details and advantages of the invention will emerge from reading the following description, with reference to the appended FIGURES, wherein:

FIG. 1 schematically shows the validation computing system according to certain embodiments

DETAILED DESCRIPTION OF THE INVENTION

Numerous combinations can be contemplated without departing from the scope of the invention: the person skilled in the art will choose one or the other based on economic, ergonomic or size constraints or other constraints they have to comply with.

"Supercomputer" is understood as infrastructures specialized in performing tasks requiring intensive computing resources (21), for example for artificial intelligence (AI), and more specifically "deep learning." In particular, these technologies are supported by the latest generation graphic cards (GPU). Supercomputers specialized in these fields of activity thus incorporate GPU cards oriented for intensive computing and for artificial intelligence. The quality control and validation method of a supercomputer production chain, for example BullSequana servers, is long and rather expensive to guarantee that the delivered solutions are robust and stable. Other examples of supercomputers can be found in the "TOP 500," a project for classifying, in decreasing order, the 500 most powerful supercomputers in the world. Thus, there are, for example, the Summit, Sierra, Frontera or Sequana systems.

For example, a Sequana is a supercomputer composed of 96 blades, each blade comprising 3 CPUs and up to 6 GPUs.

These servers are therefore particularly suitable for processes in which the computing power plays a central role, such as validation methods of transactions in a blockchain (5). Moreover, the person of the network, called a miner, who establishes the validity of the block of transactions receives cryptocurrency for "service rendered."

Currently, miners use ASICs to optimize their efficiency. However, certain hash algorithms still use the computing power of graphic cards, as is the case for the Ether cryptocurrency of the Ethereum™ BlockChain.

The invention thus relates to an automated validation method making it possible to reorient the power used during supercomputer quality controls, in order to direct the power to a remunerative function, namely blockchain mining (5).

In general, the present invention comprises a quality control computing system (1) of a computing infrastructure, the system comprising at least:
- At least a hardware and software computing infrastructure (2), preferably supercomputing, centralized or decentralized, comprising computing resources (21), preferably intensive computing resources, the computing infrastructure being capable of being connected to a decentralized blockchain database and of performing mining operations on said blockchain (5).
- computing operations management and automation software (4), configured to automate the connection of the computing infrastructure to the blockchain, and the mining performed by the computing resources (21), for example computation of at least one, preferably a plurality, of hardware and software computing infrastructures,
- quality control software associated with probes present in the computing infrastructure, the quality control software being configured to monitor the performances of the infrastructure and mining operations with the aid of said probes, in order to record said performances in a database (6) of the infrastructure or the system.

This system makes it possible to use the computing power of the supercomputer and particularly of its GPU card and the storage capacities of the latter to perform the mining, then to use the data or the results to perform quality control through the quality control software.

In certain embodiments, the management and automation software comprises at least one mining software program and a scheduler.

"Mining" is understood as an iterative process to obtain a valid hash value of a block. This process requires significant computing resources due to the large number of tests necessary to validate said block. Thus, a message (a transaction) is encrypted by a hash algorithm (hashing). Miners validate the transaction by means of cryptographic techniques performed with their computing hardware in order to find the correct hash value.

In certain embodiments, the computing resources comprise at least a GPU graphic processor or at least a specialized ASIC processor, the mining being performed by said at least one GPU graphic processor of the infrastructure or said at least one specialized ASIC processor.

Advantageously, during mining, the GPUs/CPUs are totally independent of one another and are unaffected by the poor performances of another CPU/GPU. It is also possible to test a single GPU/CPU following a malfunction, without having to retest the entire infrastructure.

An additional advantage is that a GPU mining program will hardly use any CPU, since the blockchain functions on one specific type of components without using the others. In certain embodiments, it is therefore possible to measure the CPU and GPU performances at the same time, which is not currently done within the scope of a conventional validation. In certain embodiments, the CPU and GPU tests are thus performed simultaneously and independent of one another.

In certain embodiments, the duration of the test is a minimum of 10 minutes, in order to cause the infrastructure temperature to rise. The maximum performances of the hardware are generally reached in less than 2 minutes. In certain embodiments, the duration of the test is equal to that of the conventional test, for example by the HPL Linpack software, for example between 45 minutes and one hour. A set time for the mining process is required in order to have reliable and repeatable data. In the operating systems, the scheduler designates the component of the operating system kernel choosing the order of execution of the processes on a computer's processors. A scheduler is necessary to determine which process will be executed on which processor. Thus, it is the scheduler that makes it possible to choose which processor is going to mine and when.

In some embodiments, the management and automation software makes it possible to choose to use all the processors of a computing infrastructure, such as a supercomputer, or instead use only a portion of the computing resources, even a single processor. Among other things, this makes it possible to control or re-control a processor blade, or a particular processor.

In certain embodiments, the computing operations management and automation software (4) is configured to incorporate and automate the mining performed by the computing resources (21), for example computation, of each of the hardware and software computing infrastructures, and particularly performed by at least one GPU of the infrastructure or at least one specialized ASIC processor with intensive computation resources.

The automation of mining performed by the computing resources (21), for example computing, enables the mining activity to be incorporated in quality control or validation of a computing infrastructure, for example a supercomputer.

In certain embodiments, the quality control software is configured to compare the recorded performance values to predefined threshold values, and preferably to indicate, following the comparison, the quality control status of the computing infrastructure.

In certain embodiments, the quality control software is configured to provide said control performance values by performing a conventional quality control test, for example by performing the Linpack's Highly Parallel Computing Benchmark (HPLinpack), the software being capable of computing and recording control values, for example a bracket of control values from values measured during said conventional test.

In certain embodiments, the control values are recorded in a comparison matrix, which is produced from a conventional quality control performed on the same computing resources within the same computing infrastructure model. Advantageously, this makes it possible to obtain standard values that will be used for comparison, and which enable the calculation of control values, threshold values and/or brackets of control values.

Control values are understood as values that must be reached, exceeded or not exceeded, or values computed from reference or standard values in order to obtain a bracket of values to be achieved. For example, ±5% of a reference value.

In certain embodiments, the system is capable of performing the quality control automatically.

In certain embodiments, the database of the system, in which the values of the mining performances are recorded, forms part of the storage means of the hardware and software computing infrastructure (2).

In certain embodiments, the management and automation software (4) makes it possible to use a plurality of different mining algorithms to mine a plurality of different blockchains (5) at the same time, for example Ethereum™ and Monero™. It is also possible to change blockchains to be mined, depending on periods and factors such as the efficiency of the blockchain, its requirement for resources, the type of resources required, etc.

In certain embodiments, the quality control software is executed by said hardware and software computing infrastructure in order to perform its own quality control. The results can then be compared with equivalent hardware from a conventional test infrastructure. A comparative matrix will be created for each new generation of hardware.

In certain embodiments, the hardware and software computing infrastructure (2) is oriented for intensive computing and artificial intelligence.

In certain embodiments, the hardware and software computing infrastructure (2) comprises a modular system of air-cooled blades, designed especially for intensive or high-performance computing and comprising a plurality of processors. The computing infrastructure can comprise one or more systems, such as Sequana, Sunway, or other types of supercomputers.

In the case of supercomputers, it generally involves an internal, very high speed (more than 40 Gbits per second) network (machine to machine) and low latency (less than 1 ms). The connection is made either by copper cable or fiber cable, depending on design constraints.

It should be noted that the computing system does not require high-performance Internet. However, it is preferable to at least have an ADSL or higher connection, and that it be stable. Indeed, the important thing is to be able to establish the connection between the infrastructure and the blockchain database. Thus, in certain embodiments, the blockchain database is supported internally, and the infrastructure is connected to it without going through the Internet.

In certain embodiments, the quality control method of a hardware and software computing infrastructure (2) by a system according to any one of the preceding claims, characterized in that it comprises the following steps:

Connecting the hardware and software computer infrastructure (2) to the blockchain database by the computing operations management and automation software (4), Mining by the computing resources (21) of the computing infrastructure of a blockchain from at least one blockchain database (5) by means of the computing operations management and automation software (4), Monitoring performances of the mining operations and recording values of said performances in a database of the system.

In certain embodiments, the method further comprises a step of comparing said recorded performance values to control performance values.

In certain embodiments, the method further comprises a step of indicating, following the comparison, the status of the computing infrastructure's quality Advantageously, these control values are established by executing a "conventional" validation tool on the machine. Once the validation method according to the present invention has been performed, a matrix of equivalence between the two tools is obtained, which then makes it possible to provide information about the performance of an infrastructure being evaluated only with the blockchain tool.

In certain embodiments, the method is automated.

In certain embodiments, the mining by the computing resources (21) is performed on at least two different blockchains. Advantageously, this makes it possible to improve the efficiency of the mining by optimizing the use of resources.

In certain embodiments, the software is modified so as to incorporate the characteristics of the GPUs used, because these GPUs are non-standard. The parameters should therefore be reviewed in order to optimize them so as to take best advantage of the GPU resources.

In certain embodiments, the validation method uses other blockchains utilizing other resources of the supercomputer in order to validate said other resources, such as storage capacity, or the CPU. Other types of blockchains can use the shared computing power differently and compensate for it differently. For example, in a non-limiting way, users of iExec use the computing power shared by a supercomputer to execute applications and/or perform computations in exchange for tokens.

In certain embodiments, the method further comprises a step wherein the computing infrastructure makes its data storage hardware available for mining purposes. This is referred to as hard disk or storage mining. Advantageously, this allows the infrastructure to make a portion of its storage available for mining operations to be performed on it, in exchange for compensation.

In the embodiments illustrated in a non-limiting manner, for example in FIG. 1, the system comprises management and automation software (4) for resources (21) and their automatic usage. This software operates automation programs and is connected to a decentralized blockchain database. These blockchains are managed by the management software to connect remotely with a group of miners, also called a pool of miners (51), of a block chain, and to perform computing mining operations on said blockchains. These mining operations generate compensation in the form of virtual currency, and data. In certain embodiments, these data are measured by probes present in the computing infrastructure, and recorded in a database (6), preferably of the infrastructure or the system. For example, these data can be the real time computing speed of the infrastructure. This computing speed can be measured in "hash/second" with all the variants thereof: Kilohash/s, megahash/s, etc. In certain embodiments, it can be measured directly by the mining tool. Other data can be measured, such as the temperature of the infrastructure, or the power consumption. The measured values make it possible to monitor and study the performance of said computing resources for quality control purposes. After comparison with control values, for example those produced from a conventional evaluation, they make it possible to validate that the infrastructure is properly achieving the announced or expected performances. In certain embodiments not shown, the management software is configured to recover said performance data produced from mining and to execute a program configured to evaluate the performances of said computing infrastructure from said performance data, in order to validate the quality control. In other embodiments, the management software or the computing infrastructure is configured to send said performance data produced from the mining to quality control software (not shown) executing a program configured to evaluate the performances of said computing infrastructure from said performance data, and to validate the quality control when the performances are considered sufficient.

The following table shows a non-limiting example of data that the probes present in the computing infrastructure can collect, for example as a function of the computing resources used. All these parameters are analyzed by quality control software, which can then validate the performances of the computing infrastructure in a case where said data fulfill the previously determined quality conditions.

TABLE 1

|  | Nvidia P100 | Nvidia V100 |
| --- | --- | --- |
| Temperature (nvidia-smi) | 73° C. | 76° C. |
| Ethereum Hashrate | 65 Mh/s | 85 Mh/s |
| CPU load (htop) | <1% | <1% |
| GPU load (nvidia-smi) | 100% | 100% |
| Video memory load (nvidia-smi) | 3.2 GB/16 GB | 3.2 GB/16 GB |
| Power Consumption (nvidia-smi) | 238 W/250 W | 281 W/300 W |
| Network load (dstat) | Max 100 kb/s | Max 100 kb/s |
| Disk load (dstat) | N/A | N/A |

Thus, according to the table above, a V100 GPU should have a speed of 85 Mh/s (±3%) to be validated. For 150 GPUs in a supercomputer, the GPUs being treated independently, the expected performance of said supercomputer is therefore (150*85)=12,750 Mh/s or 12.75 Gh/s (±3%).

It will be readily apparent from reading the present application that the particular features of the present invention, as generally described and illustrated in the FIGURES, can be arranged and designed in a wide variety of different configurations. Thus, the description of the present invention and the FIGURES relating thereto are not intended to limit the scope of the invention but merely represent selected embodiments.

A person skilled in the art will understand that the technical features of a given embodiment may in fact be combined with features of another embodiment unless the opposite is explicitly mentioned or it is not obvious that these features are incompatible. In addition, the technical features described in a given embodiment may be isolated from the other features of this mode unless the opposite is explicitly stated.

It must be obvious to those skilled in the art that the present invention enables embodiments in numerous other specific forms without departing from the field defined by the scope of the appended claims; they must be considered as illustrative and the invention must not be limited to the details given above.

LIST OF REFERENCE SIGNS

1. Validation computing system
2. Hardware and software computing infrastructure
21. Computing resources
22. Processor
4. Management and automation software
5. Blockchain database
51. Pool of miners
6. Database of the infrastructure or system

What is claimed is:

1. A quality control computing system for a computing infrastructure, the quality control computing system comprising:
   a hardware and software supercomputing infrastructure that is centralized or decentralized, wherein said hardware and software supercomputing infrastructure comprises
   computing resources that comprise intensive computing resources, probes, and,
   a database,
      wherein the hardware and software supercomputing infrastructure is configured to connect to a decentralized blockchain database, and perform mining operations on said decentralized blockchain database, a management and automation software that computes operations, wherein said management and automation software is configured to automate a connection of the hardware and software supercomputing infrastructure to the decentralized blockchain database, wherein said decentralized blockchain database comprises blockchains that are managed by said management and automation software to remotely connect to a pool of miners of a blockchain of said blockchains, and the mining operations performed by the computing resources, wherein said mining operations comprise computing of at least one of a plurality of hardware and software supercomputing infrastructures, wherein said mining operations generate data and compensation in a form of virtual currency, wherein said data is measured by said probes of said hardware and software supercomputing infrastructure, a quality control software associated with said probes of the hardware and software supercomputing infrastructure, wherein the quality control software is configured to monitor performances of the hardware and software supercomputing infrastructure and the mining operations using said probes, in order to record said performances as performance values in said database of the hardware and software supercomputing infrastructure, and compare the performance values that are recorded to control performance values, wherein said control performance values are produced from a conventional quality control test that is carried out via said quality control software, and indicate, following said compare, a status of a quality control of the hardware and software supercomputing infrastructure to validate that the hardware and software supercomputing infrastructure is achieving expected performances, wherein said expected performances are based on previously determined quality conditions of said hardware and software supercomputing infrastructure.

2. The quality control computing system according to claim 1, wherein the conventional quality control test is carried out by performing a Linpack's Highly Parallel Computing Benchmark (HPLinpack), wherein the quality control software is configured to compute and record said control performance values comprising a bracket of control values from said control performance values measured during said conventional quality control test.

3. The quality control computing system according to claim 1, wherein the computing resources further comprise at least one graphics processing unit (GPU) or at least one specialized Application-Specific Integrated Circuit (ASIC) processor, wherein the mining operations are performed by said at least one GPU or said at least one specialized ASIC processor.

4. The quality control computing system according to claim 1, wherein the management and automation software is capable of having the mining operations performed by only one specific processor of the computing resources of the hardware and software supercomputing infrastructure, a portion of processors of the computing resources of the hardware and software supercomputing infrastructure, or all of the processors of the computing resources of the hardware and software supercomputing infrastructure.

5. The quality control computing system according to claim 1, wherein the management and automation software is capable of having the mining operations performed by the computing resources of the plurality of hardware and software supercomputing infrastructures.

6. The quality control computing system according to claim 1, wherein the database of the quality control computing system, in which the performance values of the mining operations are recorded, forms part of a storage of the hardware and software supercomputing infrastructure.

7. The quality control computing system according to claim 1, wherein the management and automation software allows use of a plurality of different mining algorithms to mine a plurality of different blockchains at a same time.

8. The quality control computing system according claim 1, wherein the quality control software is executed by said hardware and software supercomputing infrastructure in order to perform its own quality control.

9. The quality control computing system according to claim 1, wherein the hardware and software supercomputing infrastructure is oriented for intensive computation and for artificial intelligence.

10. A quality control method of a hardware and software supercomputing infrastructure by a quality control computing system, said quality control computing system comprising said hardware and software supercomputing infrastructure that is centralized or decentralized, wherein said hardware and software supercomputing infrastructure comprises computing resources that comprise intensive computing resources, and wherein the hardware and software supercomputing infrastructure is configured to connect to a decentralized blockchain database and perform mining operations on said decentralized blockchain database, a management and automation software that computes operations, wherein said management and automation software is configured to automate a connection of the hardware and software supercomputing infrastructure to the decentralized blockchain database, and the mining operations performed by the computing resources, wherein said mining operations comprise computing of at least one of a plurality of hardware and software supercomputing infrastructures, a quality control software associated with probes present in the hardware and software supercomputing infrastructure, wherein the quality control software is configured to monitor performances of the hardware and software supercomputing infrastructure and the mining operations with aid of said probes, in order to record said performances in a database of the quality control computing system as performance values, and in order to compare the performance values that are recorded to control performance values, and in order to indicate, following said compare, a status of a quality control of the hardware and software supercomputing infrastructure;

said quality control method comprising:

connecting the hardware and software supercomputing infrastructure to the decentralized blockchain database by the management and automation software, mining, by the computing resources of the hardware and software supercomputing infrastructure, of a blockchain from said decentralized blockchain database via the management and automation software,
monitoring the performances of the mining operations and recording the performance values of said performances in the database of the quality control computing system.

11. The quality control method according to claim 10, further comprising comparing said performance values that are recorded to the control performance values.

12. The quality control method according claim 11, further comprising indicating, following the comparing, the status of the quality control of the hardware and software supercomputing infrastructure.

13. The quality control method according to claim 10, wherein the mining operations by the computing resources is performed on at least two different blockchains.

* * * * *